United States Patent
Vanbesien et al.

(10) Patent No.: US 9,580,615 B2
(45) Date of Patent: *Feb. 28, 2017

(54) PHASE CHANGE INKS COMPRISING INORGANIC NUCLEATING AGENTS

(71) Applicant: XEROX CORPORATION, Norwalk, CT (US)

(72) Inventors: Daryl W. Vanbesien, Burlington (CA); Jennifer L. Belelie, Oakville (CA); Gabriel Iftime, Mississauga (CA); Naveen Chopra, Oakville (CA); Kentaro Morimitsu, Mississauga (CA); Peter G. Odell, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 45 days.

This patent is subject to a terminal disclaimer.

(21) Appl. No.: 14/136,576

(22) Filed: Dec. 20, 2013

(65) Prior Publication Data

US 2014/0139599 A1    May 22, 2014

Related U.S. Application Data

(62) Division of application No. 13/456,993, filed on Apr. 26, 2012, now Pat. No. 8,647,424.

(51) Int. Cl.
  *C09D 11/00* (2014.01)
  *B41J 2/175* (2006.01)
  *C09D 11/34* (2014.01)
  *C09D 11/38* (2014.01)

(52) U.S. Cl.
  CPC ............ *C09D 11/34* (2013.01); *B41J 2/17593* (2013.01); *C09D 11/38* (2013.01)

(58) Field of Classification Search
  None
  See application file for complete search history.

(56) References Cited

U.S. PATENT DOCUMENTS

| | | | |
|---|---|---|---|
| 4,490,731 A | 12/1984 | Vaught | |
| 5,195,430 A | 3/1993 | Rise | |
| 5,231,135 A | 7/1993 | Machell et al. | |
| 5,389,958 A | 2/1995 | Bui et al. | |
| 5,621,022 A | 4/1997 | Jaeger et al. | |
| 6,071,986 A * | 6/2000 | Everhardus et al. | 523/160 |
| 6,221,137 B1 | 4/2001 | King et al. | |
| 6,467,897 B1* | 10/2002 | Wu et al. | 347/102 |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| 6,958,406 B2 | 10/2005 | Banning et al. | |
| 7,053,227 B2 | 5/2006 | Jaeger et al. | |
| 7,186,762 B2 | 3/2007 | Wong et al. | |
| 7,381,831 B1 | 6/2008 | Banning et al. | |
| 7,427,323 B1 | 9/2008 | Birau et al. | |
| 8,741,042 B2* | 6/2014 | Vanbesien et al. | 106/31.29 |
| 8,894,762 B2* | 11/2014 | Turek et al. | 106/31.29 |
| 8,911,544 B2* | 12/2014 | Chopra et al. | 106/31.29 |
| 2012/0272861 A1* | 11/2012 | Morimitsu et al. | 106/31.27 |
| 2012/0272864 A1* | 11/2012 | Morimitsu | C09D 11/38 106/31.61 |

OTHER PUBLICATIONS

Morimitsu, K., et al., U.S. Appl. No. 13/095,784, filed Apr. 27, 2011.
Morimitsu, K., et al., U.S. Appl. No. 13/095,795, filed Apr. 27, 2011.
Iftime, et al., U.S. Appl. No. 13/456,847, filed Apr. 26, 2012.
Belelie, et al., U.S. Appl. No. 13/095,636, filed Apr. 27, 2011.

* cited by examiner

*Primary Examiner* — Yun Qian

(74) *Attorney, Agent, or Firm* — Pillsbury Winthrop Shaw Pittman LLP

(57) ABSTRACT

A solid ink composition suitable for ink jet printing, including printing on coated paper substrates. In particular, the solid ink composition comprises a crystalline compound, an amorphous compound, and an inorganic nucleating agent, which provides for a robust and fast printing ink.

16 Claims, 2 Drawing Sheets

PHASE CHANGE INKS COMPRISING INORGANIC NUCLEATING AGENTS

CROSS-REFERENCE TO RELATED APPLICATIONS

This application is a Divisional of U.S. application Ser. No. 13/456,993, filed Apr. 26, 2012, which is expressly incorporated by reference.

BACKGROUND

The present embodiments relate to solid ink compositions characterized by being solid at room temperature and molten at an elevated temperature at which the molten ink is applied to a substrate. These solid ink compositions can be used for ink jet printing. The present embodiments are directed to a novel solid ink composition comprising an amorphous compound, a crystalline compound, and optionally a colorant, and methods of making the same. In particular, the amorphous compound is an ester of tartaric acid and the crystalline compound is an amide.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing solid ink for printing on a recording medium such as paper. In piezo ink jet printing processes employing hot melt inks, the solid ink is melted by the heater in the printing apparatus and utilized (jetted) as a liquid in a manner similar to that of conventional piezo ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "hot melt inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional solid ink technology is generally successful in producing vivid images and providing economy of jet use and substrate latitude on porous papers, such technology has not been satisfactory for coated substrates. Thus, while known compositions and processes are suitable for their intended purposes, a need remains for additional means for forming images or printing on coated paper substrates. As such, there is a need to find alternative compositions for solid ink compositions and future printing technologies to provide customers with excellent image quality on all substrates.

There is further a need to provide such solid ink compositions which are suitable for fast printing environments like production printing.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided A phase change ink comprising: an amorphous compound, wherein the amorphous compound comprises an ester of tartaric acid of Formula I or an ester of citric acid of Formula II

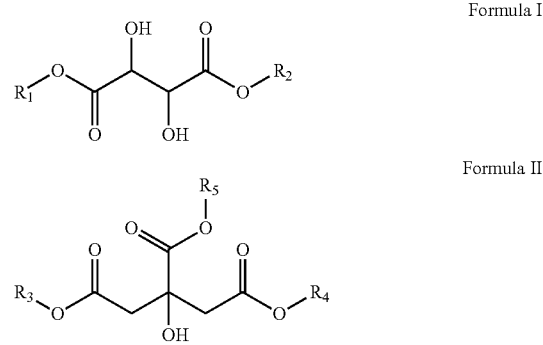

wherein each $R_1$, $R_2$, $R_3$, $R_4$ and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group, and mixtures thereof; a crystalline compound, wherein the crystalline compound comprises the following formula:

Formula VII

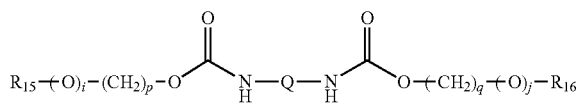

wherein Q is alkanediyl; each $R_{15}$ and $R_{16}$ is independently phenyl or cyclohexyl optionally substituted with one or more alkyl; i is 0 or 1; j is 0 or 1; p is 1 to 4; q is 1 to 4; and an inorganic nucleating agent; wherein the phase change ink crystallizes faster from the liquid state than the same composition without the inorganic nucleating agent.

In particular, the present embodiments provide a phase change ink comprising: an amorphous compound, wherein the amorphous compound comprises an ester of tartaric acid of Formula I or an ester of citric acid of Formula II Formula I

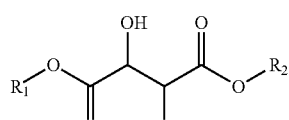

Formula II

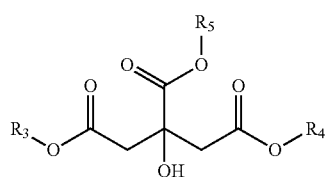

wherein each $R_1$, $R_2$, $R_3$, $R_4$ and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group, and mixtures thereof; a crystalline compound, wherein the crystalline compound comprises the following formula:

Formula VII

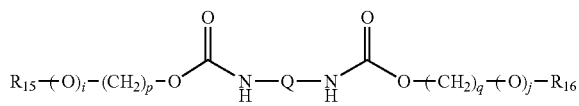

wherein Q is alkanediyl; each $R_{15}$ and $R_{16}$, is independently selected from benzyl, 2-phenylethyl, 2-phenoxyethyl, $C_6H_5(CH_2)_4$-, cyclohexyl, 2-methylcyclohexyl, 3-phenylpropanyl, 3-methylcyclohexyl, 4-methylcyclohexyl, cyclohexylmethyl, 2-methylcyclohexylmethyl, 3-methylcyclohexylmethyl, 4-methylcyclohexylmethyl, and 4-ethylcyclohexanyl; i is 0 or 1; j is 0 or 1; p is 1 to 4; q is 1 to 4; and an inorganic nucleating agent; wherein the phase change ink crystallizes faster from the liquid state than the same composition without the inorganic nucleating agent.

In further embodiments, there is provided a method of printing comprising: providing an phase change ink in an ink jet printing apparatus; melting the phase change ink; and causing droplets of the melted ink to be ejected in an imagewise pattern onto an intermediate transfer member or a final recording substrate, wherein the phase change ink comprises an amorphous compound, the amorphous compound comprising an ester of tartaric acid of Formula I or an ester of citric acid of Formula II Formula I

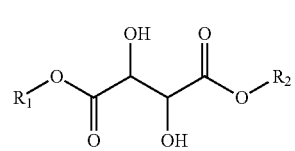

Formula II

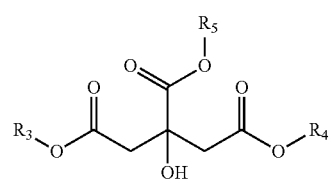

wherein each $R_1$, $R_2$, $R_3$, $R_4$ and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group, and mixtures thereof, a crystalline compound, the crystalline compound comprising the following formula:

Formula VII

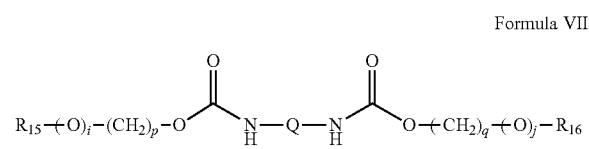

wherein Q is alkanediyl; each $R_{15}$ and $R_{16}$ is independently phenyl or cyclohexyl optionally substituted with one or more alkyl; i is 0 or 1; j is 0 or 1; p is 1 to 4; q is 1 to 4, and an inorganic nucleating agent, and further wherein the phase change ink crystallizes faster from the liquid state than the same composition without the inorganic nucleating agent.

BRIEF DESCRIPTION OF THE DRAWINGS

For a better understanding of the present embodiments, reference may be had to the accompanying figures.

DETAILED DESCRIPTION

Figure 1:
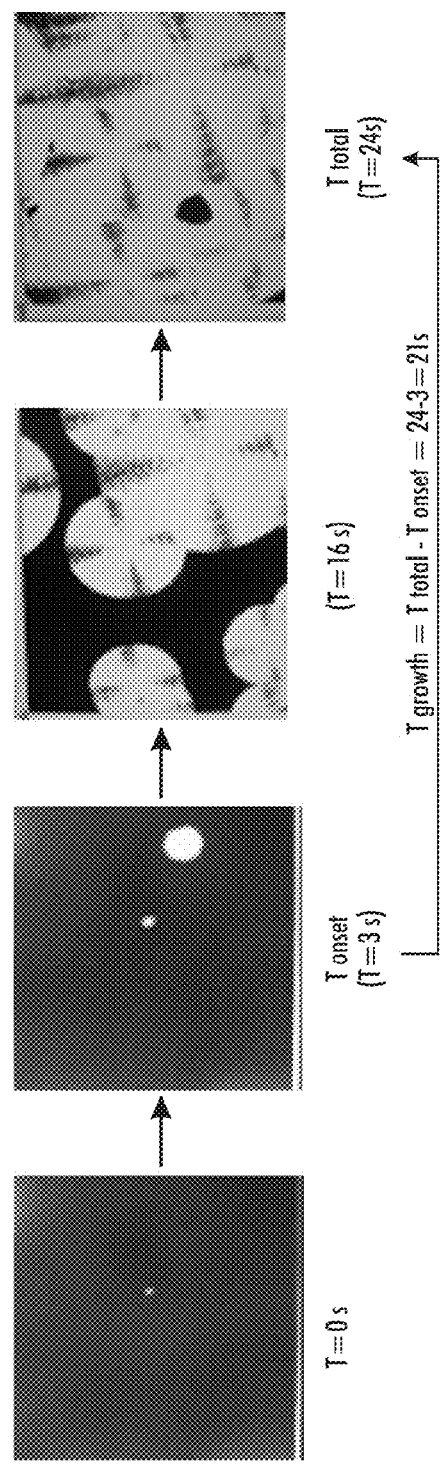
FIG. 1 illustrates the TROM (Time Resolved Optical Microscopy, described below) process showing images of crystalline formation in an ink base from crystallization onset to crystallization completion according to an embodiment of the disclosure.

In the following description, it is understood that other embodiments may be utilized and structural and operational changes may be made without departure from the scope of the present embodiments disclosed herein.

As used herein, the term "alkyl" refers to an aliphatic hydrocarbon group. The alkyl moiety may be a "saturated alkyl" group, which means that it does not contain any alkene or alkyne moieties. The alkyl moiety may also be an "unsaturated alkyl" moiety, which means that it contains at least one alkene or alkyne moiety. An "alkene" moiety refers to a group consisting of at least two carbon atoms and at least one carbon-carbon double bond, and an "alkyne" moiety refers to a group consisting of at least two carbon atoms and at least one carbon-carbon triple bond. The alkyl moiety, whether saturated or unsaturated, may be branched, straight chain, or cyclic.

The alkyl group may have 1 to 40 carbon atoms (whenever it appears herein, a numerical range such as "1 to 40" refers to each integer in the given range; e.g., "1 to 40 carbon atoms" means that the alkyl group may consist of 1 carbon atom, 2 carbon atoms, 3 carbon atoms, etc., up to and including 40 carbon atoms, although the present definition also covers the occurrence of the term "alkyl" where no numerical range is designated). The alkyl group may also be a medium size alkyl having 1 to 10 carbon atoms. The alkyl group could also be a lower alkyl having 1 to 4 carbon atoms. The alkyl group of the compounds of the invention may be designated as "$C_1$-$C_4$ alkyl" or similar designations. By way of example only, "$C_1$-$C_4$ alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl.

The alkyl group may be substituted or unsubstituted. When substituted, any group(s) besides hydrogen can be the substitutent group(s). When substituted, the substituent group(s) is(are) one or more group(s) individually and independently selected from the following non-limiting illustrative list: alkyl, cycloalkyl, hydroxy, alkoxy, cyano, halo, and amino, including mono- and di-substituted amino groups. Typical alkyl groups include, but are in no way limited to, methyl, ethyl, propyl, isopropyl, butyl, isobutyl, tertiary butyl, pentyl, hexyl, ethenyl, propenyl, butenyl, cyclopropyl, cyclobutyl, cyclopentyl, cyclohexyl, and the like. Each substituent group may be further substituted.

The term "aryl," as used herein, alone or in combination, means a carbocyclic aromatic system containing one, two or three rings wherein such rings may be attached together in a pendent manner or may be fused. The term "aryl," embraces aromatic radicals such as benzyl, phenyl, naphthyl, anthracenyl, and biphenyl.

The term "arylalkyl" as used herein, alone or in combination, refers to an aryl group attached to the parent molecular moiety through an alkyl group.

The term "alkanediyl" refers to a divalent radical of an alkane group. Such alkanediyl has a general formula —$C_n(R_xR_y)_n$—, where each $R_x$ and $R_y$ are independently a lower alkyl group or hydrogen.

The term "halo" or, alternatively, "halogen" means fluoro, chloro, bromo or iodo.

Solid ink technology broadens printing capability and customer base across many markets, and the diversity of printing applications will be facilitated by effective integration of printhead technology, print process and ink materials. The solid ink compositions are characterized by being solid at room temperature (RT) (e.g., 20-27° C.) and molten at an elevated temperature at which the molten ink is applied to a substrate. As discussed above, while current ink options are successful for porous paper substrates, these options are not always satisfactory for coated paper substrates.

It was previously discovered that using a mixture of crystalline and amorphous small molecule compounds in solid ink formulations provides robust inks, and in particular, solid inks which demonstrate robust images on coated paper. (U.S. patent application Ser. No. 13/095,636 entitled "Solid Ink Compositions Comprising Crystalline-Amorphous Mixtures" to Jennifer L. Belelie et al. filed Apr. 27, 2011.

Using this approach is surprising, however, due to the known properties of crystalline or amorphous materials. For crystalline materials, small molecules generally tend to crystallize when solidifying and low molecular weight organic solids are generally crystals. While crystalline materials are generally harder and more resistant, such materials are also much more brittle, so that printed matter made using a mainly crystalline ink composition is fairly sensitive to damage. For amorphous materials, high molecular weight amorphous materials, such as polymers, become viscous and sticky liquids at high temperature, but do not show sufficiently low viscosity at high temperatures. As a result, the polymers cannot be jetted from print head nozzles at desirable jetting temperature (≤140° C.). In the present embodiments, however, it is discovered that a robust solid ink can be obtained through a blend of crystalline and amorphous compounds.

However, the present inventors discovered that in many cases addition of a dye colorant to an ink base composition comprised of an amorphous and a crystalline compound typically results in inks which solidify, i.e. crystallize, too slowly to be useful for fast printing. Furthermore, many ink base compositions made of mixtures of an amorphous and a crystalline components were shown to also solidify too slowly. Solidification of the ink is due to crystallization of the crystalline component in the ink when cooling. The inventors have found that fast crystallization is not an inherent property of a crystalline-amorphous composition. Methods for providing fast crystallizing crystalline-amorphous inks are not obvious.

The present inventors discovered that addition of an inorganic nucleating agent to a composition made of crystalline and amorphous components results in acceleration of the crystallization of the ink when cooling from the molten state.

The present embodiments provide a new type of ink jet solid ink composition which comprises a blend of (1) crystalline and (2) amorphous compounds, generally in a weight ratio of from about 60:40 to about 95:5, respectively. In more specific embodiments, the weight ratio of the crystalline to amorphous compound is from about 65:35 to about 95:5, or is from about 70:30 to about 90:10, or is from about 70:30 to about 80:20. In other embodiments, the crystalline and amorphous compounds are blended in a weight ratio of from about 1.5 to about 20, or from about 2.0 to about 10, respectively.

Each compound or component imparts specific properties to the solid inks, and the resulting inks incorporating a blend of these amorphous and crystalline compounds demonstrate excellent robustness on uncoated and coated substrates. The crystalline compound in the ink formulation drives the phase change through rapid crystallization on cooling. The crystalline compound also sets up the structure of the final ink film and creates a hard ink by reducing the tackiness of the amorphous compound. The amorphous compounds provide tackiness and impart robustness to the printed ink.

The Amorphous Compound

In embodiments, the amorphous compound may comprise an ester of tartaric acid of Formula I or an ester of citric acid of Formula II

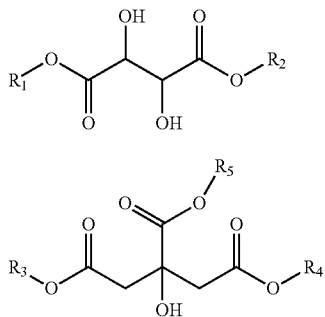

Formula I

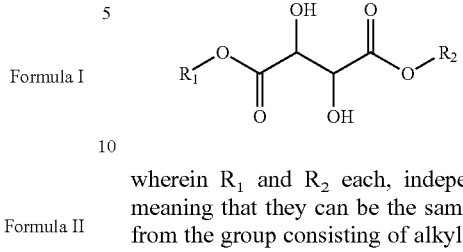

Formula II wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group, and mixtures thereof. In certain embodiments, each $R_1$, $R_2$, $R_3$, $R_4$ and $R_5$ is independently a cyclohexyl group optionally substituted with one or more alkyl groups selected from methyl, ethyl, n-propyl, isopropyl, n-butyl and t-butyl. In certain embodiments, each $R_1$, $R_2$, $R_3$, $R_4$ and $R_5$ is independently a cyclohexyl group optionally substituted with one or more alkyl groups selected from methyl, ethyl, n-propyl, isopropyl, n-butyl and t-butyl.

Referring to Formula I, in certain embodiments, one of $R_1$ and $R_2$ is 2-isopropyl-5-methylcyclohexyl, and the other one of $R_1$ and $R_2$ is 2-isopropyl-5-methylcyclohexyl, 4-t-butylcyclohexyl, or cyclohexyl, or one of $R_1$ and $R_2$ is 4-t-butylcyclohexyl, and the other one of $R_1$ and $R_2$ is cyclohexyl. In certain embodiment, $R_1$ and $R_2$ are each 2-isopropyl-5-methylcyclohexyl. In certain embodiment, $R_1$ is 2-isopropyl-5-methylcyclohexyl and $R_2$ is 4-t-butylcyclohexyl. In certain embodiment, $R_1$ is 2-isopropyl-5-methylcyclohexyl and $R_2$ is cyclohexyl. In certain embodiment, $R_1$ is 4-t-butylcyclohexyl and $R_2$ is cyclohexyl.

Referring to Formula II, in certain embodiments, one of $R_3$, $R_4$ and $R_5$ is 2-isopropyl-5-methylcyclohexyl, and the other one of $R_3$, $R_4$ and $R_5$ is 2-isopropyl-5-methylcyclohexyl, 4-t-butylcyclohexyl, or cyclohexyl, or one of $R_3$, $R_4$ and $R_5$ is 4-t-butylcyclohexyl, and the other one of $R_3$, $R_4$ and $R_5$ is cyclohexyl. In certain embodiment, $R_3$, $R_4$ and $R_5$ are each 2-isopropyl-5-methylcyclohexyl. In certain embodiment, $R_3$ is 2-isopropyl-5-methylcyclohexyl and $R_4$ and $R_5$ are each 4-t-butylcyclohexyl. In certain embodiment, $R_3$ is 2-isopropyl-5-methylcyclohexyl and $R_4$ and $R_5$ are each cyclohexyl. In certain embodiment, $R_3$ is 4-t-butylcyclohexyl and $R_4$ and $R_5$ are each cyclohexyl Some suitable amorphous materials are disclosed in U.S. patent application Ser. No. 13/095,784 to Morimitsu et al., which is hereby incorporated by reference in its entirety. The amorphous materials may comprise an ester of tartaric acid having a formula of wherein $R_1$ and $R_2$ each, independently of the other or meaning that they can be the same or different, is selected from the group consisting of alkyl group, wherein the alkyl portion can be straight, branched or cyclic, saturated or unsaturated, substituted or unsubstituted, having from about 1 to about 40 carbon atoms or a substituted or unsubstituted aromatic or heteroaromatic group, and mixtures thereof. In certain embodiments, each $R_1$ and $R_2$ is independently a cyclohexyl group optionally substituted with one or more alkyl group(s) selected from methyl, ethyl, n-propyl, isopropyl, n-butyl and t-butyl. In certain embodiments, $R_1$ and $R_2$ are each 2-isopropyl-5-methylcyclohexyl.

The tartaric acid backbone is selected from L-(+)-tartaric acid, D-(−)-tartaric acid, DL-tartaric acid, or mesotartaric acid, and mixtures thereof. Depending on the R groups and the stereochemistries of tartaric acid, the esters could form crystals or stable amorphous compounds. In specific embodiments, the amorphous compound is selected from the group consisting of di-L-menthyl L-tartrate, di-DL-menthyl L-tartrate (DMT), di-L-menthyl DL-tartrate, di-DL-menthyl DL-tartrate, and any stereoisomers and mixtures thereof.

The amorphous compound may comprise an ester of citric acid disclosed in U.S. patent application Ser. No. 13/095,795 to Morimitsu et al., which is hereby incorporated by reference in its entirety. These amorphous materials are synthesized by an esterification reaction of citric acid. In particular, citric acid was reacted with a variety of alcohols to make tri-esters according to the synthesis scheme shown in U.S. patent application Ser. No. 13/095,795. The amorphous compounds are synthesized by an esterification reaction of tartaric acid.

These materials show relatively low viscosity ($<10^2$ centipoise (cps), or from about 1 to about 100 cps, or from about 5 to about 95 cps) near the jetting temperature ($\leq 140°$ C., or from about 100 to about 140° C., or from about 105 to about 140° C.) but very high viscosity ($>10^5$ cps) at room temperature.

In particular, di-DL-menthyl L-tartrate (DMT) was found to be especially suitable for use as an amorphous compound in the present ink embodiments.

To synthesize the amorphous component, tartaric acid was reacted with a variety of alcohols to make di-esters as shown in the synthesis scheme shown in U.S. patent application Ser. No. 13/095,784. A variety of alcohols may be used in the esterification such as, for example, menthol, isomenthol, neomenthol, isoneomenthol and any stereoisomers and mixtures thereof. Mixtures of aliphatic alcohols may be used in the esterification. For example, a mixture of two aliphatic alcohols may be used in the esterification. The molar ratios of the aliphatic alcohols may be from 25:75 to 75:25, from 40:60 to 60:40, or about 50:50. Examples of suitable aliphatic alcohol whose mixtures form amorphous compounds when reacted with tartaric acid include cyclohexanol and substituted cyclohexanol (e.g., 2-, 3-, or 4-tert-butyl-cyclohexanol). In embodiments, two or more molar equivalents of alcohol may be used in the reaction to produce the di-esters of tartaric acid. If one molar equivalent of alcohol is used, the result is mostly mono-esters.

In certain embodiments, the amorphous compound comprises bis(2-isopropyl-5-methylcyclohexyl) L-tartrate or (4-t-butylcyclohexyl)-(cyclohexyl)-L-tartrate and any stereoisomers.

Other suitable amorphous components include those disclosed in U.S. patent application Ser. No. 13/095,795 to Morimitsu et al., which is hereby incorporated by reference in its entirety. The amorphous materials may comprise a compound having the following structure:

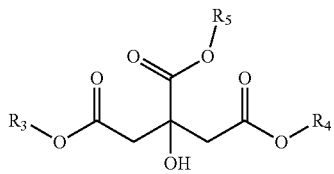

$R_3$, $R_4$ and $R_5$ are independently an alkyl group, wherein the alkyl can be straight, branched or cyclic, saturated or unsaturated, substituted or unsubstituted, having from about 1 to about 40 carbon atoms, or an substituted or unsubstituted aromatic or heteroaromatic group, and mixtures thereof. In particular, tri-DL-menthyl citrate (TMC) is a desirable amorphous candidate which affords suitable thermal and rheological properties as well imparts robustness to the print images.

These amorphous materials are synthesized by an esterification reaction of citric acid. In particular, citric acid was reacted with a variety of alcohols to make tri-esters according to the synthesis scheme disclosed therein. In embodiments, the phase change ink composition is obtained by using amorphous compounds synthesized from citric acid and at least one alcohol in an esterification reaction.

In embodiments, the amorphous compound may comprise a diurethane compound having a formula of:

Formula III

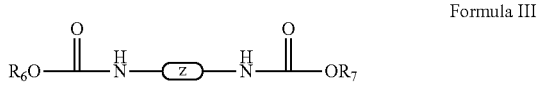

wherein Z is selected from the group consisting of:

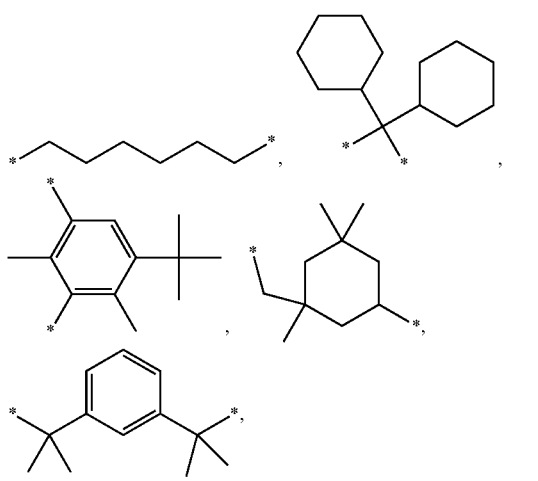

and wherein Z can be attached to either side of the nitrogen atom of the diurethane formula through the bond labeled with *; each $R_6$ and $R_7$ is i) an alkyl group wherein the alkyl can be linear or branched having from about 1 to about 8 carbon atoms, or ii) an aryl group; with the proviso that when Z is —$(CH_2)_6$—, both $R_6$ and $R_7$ are not —$(CH_2)_n$—$C_6H_5$ wherein n=0-4. Each $R_6$ and $R_7$ can be any linear or branched alkyl including methyl, ethyl, propyl, (n-, iso-, sec- and t-)butyl, (n-, iso-, t- and the like) pentyl, (n-, iso-, t- and the like) hexyl, (n-, iso-, t- and the like) heptyl, or (n-, iso-, t- and the like) octyl.

In certain embodiments, $R_6$ and $R_7$ is independently selected from the group consisting of:

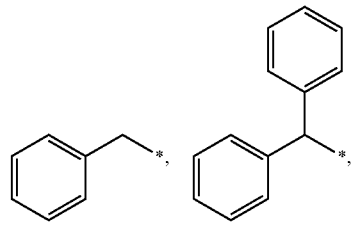

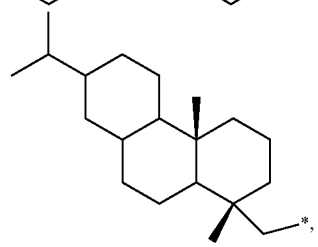

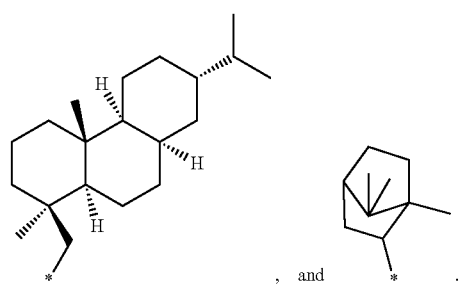

In certain embodiments, z is —(CH$_2$)$_6$— and both R$_6$ and R$_7$ are

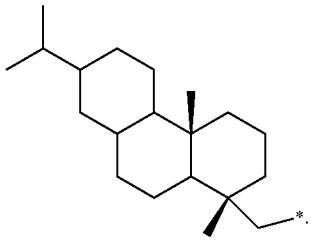

R$_6$ and R$_7$ can also be fused ring alcohols, hydroabietyl alcohol (e.g. rosin alcohols), isoborneol, and octyl phenol ethoxylate (such as Igepal CA210, from Rhodia).

These materials show relatively low viscosity (<10$^2$ centipoise (cps), or from about 1 to about 100 cps, or from about 5 to about 95 cps) near the jetting temperature 140° C., or from about 100 to about 140° C., or from about 105 to about 140° C.) but very high viscosity (>10$^5$ cps) at room temperature.

In embodiments, the amorphous compounds are formulated with a crystalline compound to form a solid ink composition. The ink compositions show good rheological profiles. Print samples created by the solid ink composition on coated paper by K-proof exhibit excellent robustness. Furthermore, using tartaric acid as an ester base has additional advantages of being low cost, and being obtained from a potential bio-derived source.

In embodiments, the solid ink composition is obtained by using novel amorphous compounds synthesized from tartaric acid and at least one alcohol in an esterification reaction. The solid ink composition comprises the amorphous compound in combination with a crystalline compound and a colorant. The present embodiments comprise a balance of amorphous and crystalline compounds to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the present esters of tartaric acid, which provide amorphous compounds for the solid inks, have been discovered to produce robust inks having desirable rheological profiles and that meet the many requirements for inkjet printing.

In embodiments, the amorphous material is present an amount of from about 5 percent to about 40 percent by weight, or from about 5 percent to about 35 percent by weight, or from about 10 percent to about 30 percent by weight of the total weight of the ink composition.

The Crystalline Compound

The crystalline component may comprise amide, aromatic ester, linear diester, urethanes, sulfones, tartaric acid ester derivatives with aromatic groups, or mixtures thereof.

Suitable crystalline components include those disclosed in U.S. patent application Ser. No. 13/457,221 to Morimitsu et al., entitled "Phase Change Ink Comprising Crystalline Amides," which is hereby incorporated by reference in its entirety. These crystalline materials comprise the following structure:

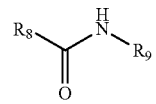

Formula IV wherein R$_8$ and R$_9$ can be the same or different, each R$_8$ and R$_9$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, from about 6 to about 20 carbon atoms, or from about 6 to about 10 carbon atoms.

Suitable crystalline components include those disclosed in U.S. patent application Ser. No. 13/456,916 to Morimitsu et al., entitled "Phase Change Ink Compositions Comprising Aromatic Ethers," which is hereby incorporated by reference in its entirety. These crystalline materials comprise the following structure:

$$R_{10}—O—[(CH_2)_2O]_p—R_{11}$$  Formula V wherein R$_{10}$ and R$_{11}$ can be the same or different, and wherein each R$_{10}$ and R$_{11}$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, or about 6 to about 20 carbon atoms, or from about 6 to about 10 carbon atoms, although the numbers can be outside of these ranges, and mixtures thereof, provided that at least one of R$_{10}$ and R$_{11}$ is an aromatic group; and p is 0 or 1.

Non-limited examples of crystalline aromatic ether include

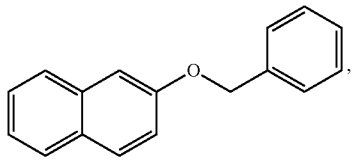,
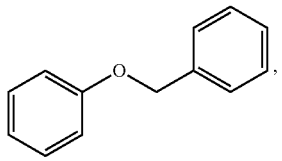,
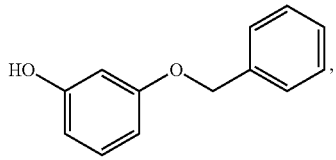,
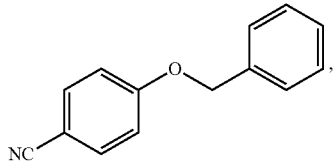,
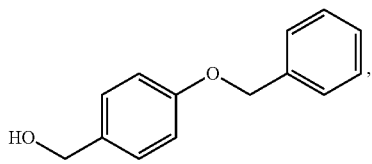,
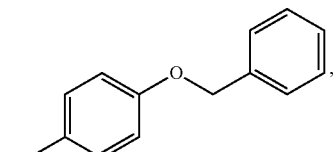,
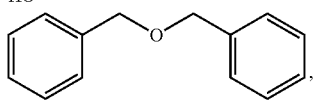,
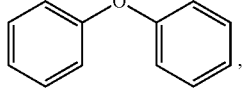,
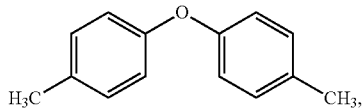,
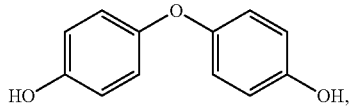,
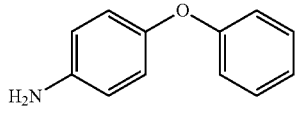,
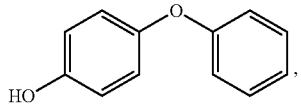,
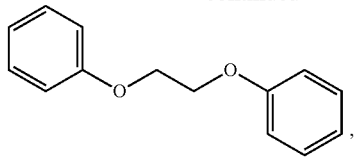, and mixtures thereof.

Suitable crystalline components include those disclosed in U.S. patent application Ser. No. 13/095,555 to Chopra et al., entitled "Phase Change Inks and Methods of Making the Same," which is hereby incorporated by reference in its entirety. These crystalline materials comprise an ester of an aliphatic linear diacid having the following structure:

Formula VI

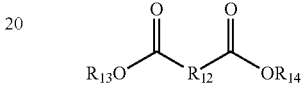

wherein $R_{12}$ may be substituted or unsubstituted alkyl chain and is selected from the group consisting of —$(CH_2)_1$— to —$(CH_2)_{12}$—, and wherein $R_{13}$ and $R_{14}$, each independently of the other, is selected from the group consisting of a substituted or unsubstituted aromatic or heteroaromatic group, substituents including alkyl groups, wherein the alkyl portion can be straight, branched or cyclic.

Suitable crystalline components include those disclosed in U.S. patent application Ser. No. 13/456,619 to Chopra et al., entitled "Phase Change Ink Compositions Comprising Diurethanes and Derivatives Thereof," which is hereby incorporated by reference in its entirety. These crystalline materials comprise diurethanes having the following structure:

Formula VII

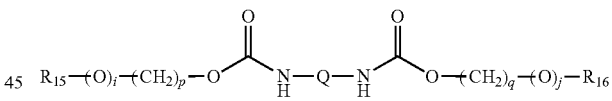

wherein Q is alkanediyl; each $R_{15}$ and $R_{16}$ is independently phenyl or cyclohexyl optionally substituted with one or more alkyl; i is 0 or 1; j is 0 or 1; p is 1 to 4; q is 1 to 4. In certain of such embodiments, each $R_{15}$ and $R_{16}$ is independently phenyl or cyclohexyl optionally substituted with one or more methyl or ethyl. In certain of such embodiments, $R_{15}$ and $R_{16}$ is phenyl. In certain embodiments, Q is —$(CH_2)_n$— and n is 4 to 8. In certain of such embodiments, n is 6. In certain embodiments, each $R_{15}$ and $R_{16}$, is independently selected from benzyl, 2-phenylethyl, 2-phenoxyethyl, $C_6H_5(CH_2)_4$—, cyclohexyl, 2-methylcyclohexyl, 3-phenylpropanyl, 3-methylcyclohexyl, 4-methylcyclohexyl, cyclohexylmethyl, 2-methylcyclohexylmethyl, 3-methylcyclohexylmethyl, 4-methylcyclohexylmethyl, and 4-ethylcyclohexanyl.

Suitable crystalline components include those disclosed in U.S. patent application Ser. No. 13/457,323 to Morimitsu et al., entitled "Phase change ink Compositions Comprising Crystalline Sulfone Compounds and Derivatives Thereof" which is hereby incorporated by reference in its entirety.

These crystalline component being a sulfone compound having the following structure:

$$R_{17}—SO_2—R_{18} \qquad \text{Formula VIII}$$

wherein $R_{17}$ and $R_{18}$ can be the same or different, and wherein $R_{17}$ and $R_{18}$ each, independently of the other is selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, although the numbers can be outside of these ranges, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms, although the numbers can be outside of these ranges; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to from about 40 carbon atoms, from about 6 to about 20 carbon atoms, or about 6 to about 10 carbon atoms, although the numbers can be outside of these ranges, and mixtures thereof.

In certain embodiments, each $R_{17}$ and $R_{18}$ is independently alkyl, or aryl, optionally substituted with one or more halo, amino, hydroxy, or cyano groups and combinations thereof, or $R_{17}$ and $R_{18}$ taken together with the S atom to which they are attached form a heterocyclic ring. In certain of such embodiments, each $R_{17}$ and $R_{18}$ is independently an optionally substituted alkyl, such as, methyl, ethyl, isopropyl, n-butyl, or t-butyl. In certain of such embodiments, each $R_6$ and $R_7$ is independently an optionally substituted aryl, such as, phenyl, or benzyl. In certain embodiments, each $R_{17}$ and $R_{18}$ is independently substituted with one or more amino, chloro, fluoro, hydroxy, cyano or combinations thereof. Substitution on the aryl groups may be made in the ortho, meta or para position of the phenyl groups and combinations thereof. In certain embodiments, each $R_{17}$ and $R_{18}$ is independently 2-hydroxyethyl, or cyanomethyl.

In certain embodiments, the crystalline component may include diphenyl sulfone, dimethyl sulfone, bis(4-hydroxyphenyl)sulfone, bis(4-aminophenyl)sulfone, bis(3-aminophenyl)sulfone, bis(4-chlorophenyl)sulfone, bis(4-fluorophenyl)sulfone, 2-hycroxyphenyl-4-hydroxyphenyl sulfone, phenyl-4-chlorophenyl sulfone, phenyl-2-aminophenyl sulfone, bis(3-amino-4-hydroxyphenyl)sulfone, dibenzyl sulfone, methylethyl sulfone, diethyl sulfone, methylisopropyl sulfone, ethylisopropyl sulfone, di-n-butyl sulfone, divinyl sulfone, methyl-2-hydroxymethyl sulfone, methylchloromethyl sulfone, sulfolane, 3-sulfolene, and mixtures thereof.

The crystalline compound may comprise an ester of tartaric acid of the following formula:

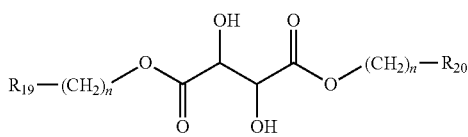

Formula IX wherein each $R_{19}$ and $R_{20}$ is independently an aryl or a heteroaryl optionally substituted with a lower alkyl and alkoxy, each n is independently 0 to 3. In certain embodiments, each $R_{19}$ and $R_{20}$ is independently an optionally substituted aryl, such as a phenyl. In certain embodiments, each $R_{19}$ and $R_{20}$ is independently not substituted, or substituted with methyl, ethyl, isopropyl, methoxy or ethyoxy. In certain embodiments, each $R_{19}$ and $R_{20}$ is independently a phenyl optionally substituted with methyl or methoxy.

In certain embodiments, each $R_{19}$ and $R_{20}$, independently is selected from the group consisting of

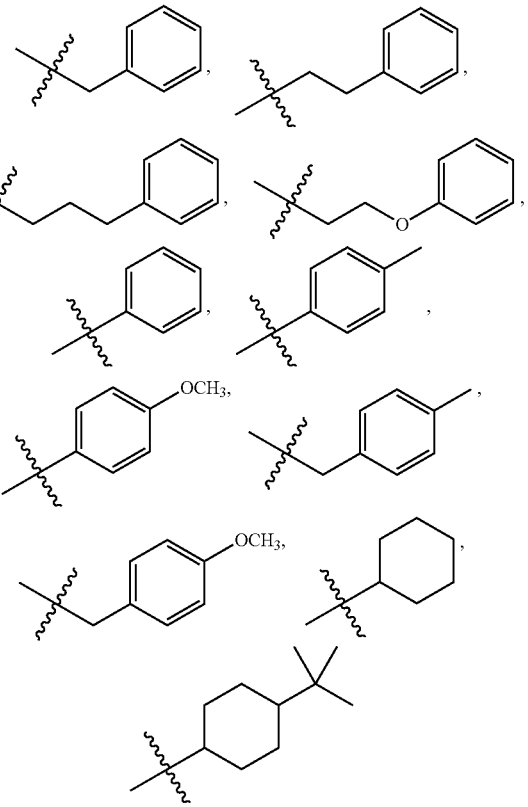

and mixtures thereof.

In certain embodiments, the tartaric acid backbone is selected from L-(+)-tartaric acid, D-(–)-tartaric acid, DL-tartaric acid, or mesotartaric acid, and mixtures thereof.

In certain embodiments, the crystalline compound is selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis(4-methylphenyl) L-tartrate, bis(4-methoxylphenyl) L-tartrate, bis(4-methylbenzyl) L-tartrate, bis(4-methoxylbenzyl) L-tartrate, and mixtures thereof.

The crystalline materials show sharp crystallization, relatively low viscosity ($\leq 10^1$ centipoise (cps), or from about 0.5 to about 20 cps, or from about 1 to about 15 cps) at a temperature of about 140° C., but very high viscosity (>$10^6$ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The $\Delta T$ between $T_{melt}$ and $T_{crys}$ is less than about 55° C.

In embodiments, the crystalline material is present an amount of from about 60 percent to about 95 percent by weight, or from about 65 percent to about 95 percent by weight, or from about 70 percent to about 90 percent by weight of the total weight of the ink composition.

Inorganic Nucleating Agent

The phase change ink composition of the present embodiments comprises an inorganic nucleating agent. Inorganic nucleating agents include materials such as silica, silica dioxide, alumina, zinc oxide, mixed inorganic oxides, talc, mica and salts of barium, calcium, sodium, lithium, aluminum, and the like. In one embodiment, the inorganic nucleating agent is silica dioxide. Such inorganic nucleating agents may be used alone or as mixtures.

In certain embodiments, inorganic nucleating agents are nanoparticles. Inorganic nucleating agent particle size typically ranges from 2 nanometers (nm) to about 300 nm. In one embodiment, the ink composition comprises inorganic nucleating agent particles having a particle size of about 10 nm to about 100 nm.

Typically, the inorganic nucleating agent is present in amounts from about 0.1 to about 10 weight percent, from about 0.5 to about 5 weight percent, or from about 1 to about 3 weight percent based on the total weight of the ink composition.

In the present embodiments, the solid ink composition may also comprise the crystalline and amorphous material in combination with a colorant. The present embodiments comprise a balance of amorphous and crystalline materials to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the resulting ink compositions comprising a blend of the crystalline and amorphous compounds show good rheological profiles and that meet the many requirements for ink jet printing.

The ink composition, in specific embodiments, comprises a colorant, which may be a pigment or dye, present in the ink composition in an amount of at least from about 0.1 percent to about 50 percent by weight, or at least from about 0.2 percent to about 20 percent by weight, from about 0.5 percent to about 10 percent, from about 1 percent to about 5 percent by weight of the total weight of the ink composition.

Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Lampronol Black BR (C.I. Solvent Black 35) (ICI); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, in the molten state, the resulting solid ink has a viscosity of from about 1 to about 22 cps, or from about 4 to about 15 cps, or from about 6 to about 12 cps, at a the jetting temperature. The jetting temperature is typically comprised in a range from about 100° C. to about 140° C. In embodiments, the solid ink has a viscosity of about >10$^6$ cps, at room temperature. In embodiments, the solid ink has a $T_{melt}$ of from about 65 to about 140° C., or from about 70 to about 140° C., from about 80 to about 135° C. and a $T_{crys}$ of from about 40 to about 140° C., or from about 45 to about 130° C., from about 50 to about 120° C., as determined by DSC at a rate of 10° C./min.

The ink of embodiments may further include conventional additives to take advantage of the known functionality associated with such conventional additives. Such additives may include, for example, at least one antioxidant, defoamer, slip and leveling agents, clarifier, viscosity modifier, adhesive, and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF), 2,2-bis(4-(2-(3,5-di-tert-butyl-4-hydroxyhydrocinnamoyloxy))ethoxyphenyl)propane (TOPANOL-205, available from Vertullus), tris(4-tert-butyl-3-hydroxy-2,6-dimethyl benzyl)isocyanurate (Aldrich), 2,2'-ethylidene bis(4,6-di-tert-butylphenyl)fluoro phosphonite (ETHANOX-398, available from Albermarle Corporation), tetrakis(2,4-di-tert-butylphenyl)-4,4'-biphenyl diphosphonite (Aldrich), pentaerythritol tetrastearate (TCI America), tributylammonium hypophosphite (Aldrich), 2,6-di-tert-butyl-4-methoxyphenol (Aldrich), 2,4-di-tert-butyl-6-(4-methoxybenzyl)phenol (Aldrich), 4-bromo-2,6-dimethylphenol (Aldrich), 4-bromo-3,5-didimethylphenol (Aldrich), 4-bromo-2-nitrophenol (Aldrich), 4-(diethyl aminomethyl)-2,5-dimethylphenol (Aldrich), 3-dimethylaminophenol (Aldrich), 2-amino-4-tert-amylphenol (Aldrich), 2,6-bis(hydroxymethyl)-p-cresol (Aldrich), 2,2'-methylenediphenol (Aldrich), 5-(diethyl-amino)-2-nitrosophenol (Aldrich), 2,6-dichloro-4-fluorophenol (Aldrich), 2,6-dibromo fluoro phenol (Aldrich), α-trifluoro-o-cresol (Aldrich), 2-bromo-4-fluorophenol (Aldrich), 4-fluorophenol (Aldrich), 4-chlorophenyl-2-chloro-1,1,2-tri-fluoroethyl sulfone (Aldrich), 3,4-difluoro phenylacetic acid (Adrich), 3-fluorophenylacetic acid (Aldrich), 3,5-difluoro phenylacetic acid (Aldrich), 2-fluorophenylacetic acid (Aldrich), 2,5-bis(trifluoromethyl)benzoic acid (Aldrich), ethyl-2-(4-(4-(trifluoromethyl)phenoxy)phenoxy) propionate (Aldrich), tetrakis(2,4-di-tert-butyl phenyl)-4,4'-biphenyl diphosphonite (Aldrich), 4-tert-amyl phenol (Aldrich), 3-(2H-benzotriazol-2-yl)-4-hydroxy phenethylalcohol (Aldrich), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

Pigment dispersions in the ink base may be stabilized by dispersants. Also, to enable dispersion of the pigments in the liquid vehicle, a dispersant or combination of dispersants may optionally be provided. Typically, dispersants may be used to stabilize particles in the ink vehicle. The dispersant generally comprises first functional groups that anchor the dispersant to the pigment particles and second functional groups that are compatible with the ink vehicle. The first functional groups can suitably anchor or adsorb to the pigment particle in any suitable manner, such as hydrogen bonding, chemical bonding, acid-base reaction, Van der Waals interactions, and the like. Thus, examples of suitable first functional groups that anchor the dispersant to the pigment particles include such functional groups as esters, amides, carboxylic acids, hydroxyl groups, anhydrides, urethanes, ureas, amines, amides, salt groups such as quaternary ammonium salts, and the like. The first functional groups anchor the dispersant to the colorant particles such that the dispersant is, for example, adsorbed, attached to, or grafted to the pigment particle. Likewise, examples of the second functional groups that are compatible with the ink vehicle include groups such as alkyl groups, which can be straight or branched, saturated or unsaturated, and the like. Examples of suitable dispersants that may be used in embodiments include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); FOAM BLAST 20F, 30, 550 (Lubrizol); EFKA-1101, -4046, -4047, -43402025, -2035, -2040, -2021, -3600, -3232; SOLSPERSE 13240, 16000, 17000, 17940, 19000, 28000, 32500, 32000 38500, 39000, 54000 (Lubrizol); and mixtures thereof. Individual dispersants or combinations may optionally be used with synergists including SOLSPERSE 5000, 12000, 22000 (Lubrizol); DISPERBYK-108, -163, -167, 182 (BYK-Chemie); and K-SPERSE 132, XD-A503, XD-A505 (King Industries).

The dispersant may be present in the solid ink in any effective amount, such as in amounts of from about 0.1% to about 40% by weight of the ink, such as from about 0.5% to about 25%, or from about 1% to about 13%.

In embodiments, in the molten state, the ink carriers for the phase change inks may have a viscosity of from about 1 to about 22 cps, or from about 4 to about 15 cps, or from about 6 to about 12 cps, at a the jetting temperature. The jetting temperature is typically comprised in a range from about 100° C. to about 140° C. In embodiments, the solid ink has a viscosity of about >10$^6$ cps, at room temperature. In embodiments, the solid ink has a $T_{melt}$ of from about 65 to about 140° C., or from about 70 to about 140° C., from about 80 to about 135° C. and a T$_{crys}$ of from about 40 to about 140° C., or from about 45 to about 130° C., from about 50 to about 120° C., as determined by DSC at a rate of 10° C./min.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or ball mill apparatus or other high energy mixing equipment to affect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including coated and plain paper. Coated paper includes silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTRO-GLOSS, specialty papers such as Xerox DURAPAPER, and the like. Plain paper includes such as XEROX 4200 papers, XEROX Image Series papers, Courtland 4024 DP paper, ruled notebook paper, bond paper. Transparency materials, fabrics, textile products, plastics, polymeric films, inorganic recording mediums such as metals and wood, may also be used.

Such robust inks may be used with printing equipment at high speeds. Typically, production digital presses print at a speed comprised from about 100 to 500 or more feet/minute. This requires inks which are capable of solidifying very fast once placed onto the paper, in order to prevent offset of the printed image during fast printing process, where printed paper is either stacked (cut-sheet printers) or rolled (continuous feed printers). Fast crystallization is not a general or inherent property of crystalline-amorphous robust inks. Therefore not all crystalline-amorphous inks are suitable for fast printing.

In order to evaluate the suitability of a test ink for fast printing a quantitative method for measuring the rates of crystallization of solid inks containing crystalline components was developed. TROM (Time-Resolved Optical Microscopy) enables comparison between various test samples and, as a result, is a useful tool for monitoring the progress made with respect to the design of fast crystallizing inks.

TROM is described in co-pending U.S. patent application Ser. No. 13/456,847 entitled "TROM Process for Measuring the Rate of Crystallization of Solid Inks" to Gabriel Iftime et al., electronically filed on the same day herewith, Time Resolved Optical Microscopy TROM monitors the appearance and the growth of crystals by using Polarized Optical Microscopy (POM). The sample is placed between crossed polarizers of the microscope. Crystalline materials are visible because they are birefringent. Amorphous materials or liquids, similar to, for example, inks in their molten state that do not transmit light, appear black under POM. Thus, POM enables an image contrast when viewing crystalline components and allows for pursuing crystallization kinetics of crystalline-amorphous inks when cooled from the molten state to a set-temperature. Polarized Optical Microscopy (POM) enables exceptional image contrast when viewing crystalline components.

In order to obtain data that allows comparison between different and various samples, standardized TROM experimental conditions were set, with the goal of including as many parameters relevant to the actual printing process.

The key set parameters include:
(a) glass slides of a 16-25 mm diameter and a thickness comprise in between 0.2 mm to 0.5 mm.
(b) ink sample thickness comprised in a range from 5 to 25 microns
(c) cooling temperature set at 40° C.

For rate of crystallization measurements, the sample is heated to the expected jetting temperature (viscosity=10-12 cps) via an offline hotplate and then transferred to a cooling stage coupled with an optical microscope. The cooling stage is thermostated at a preset temperature which is maintained by controlled supply of heat and liquid nitrogen. This experimental set-up models the expected drum/paper temperature onto which a drop of ink would be jetted in real printing process (40° C. for the experiments described below). Crystal formation and growth is recorded with a camera.

The key steps in the TROM process are illustrated in FIG. 1, highlighting the key steps in the measuring process with the mainline ink base which contains just amorphous and crystalline components (no dye or pigment). When viewed under POM, the molten and at time zero, the crystalline-amorphous inks appear black as no light is passed through. As the sample crystallizes, the crystalline areas appear brighter. The numbers reported by TROM include: the time from the first crystal (crystallization onset) to the last (crystallization completion).

The definition of key measured parameters of the TROM process are set forth below:

Time zero($T$=0 s)–the molten sample is placed on the cooling stage under microscope $T$onset=the time when the first crystal appears $T$growth=the duration of the crystal growth from the first crystal($T$ onset) to the completion of the crystallization($T$total)

$T$total=$T$onset+$T$growth

It should be understood that the crystallization times obtained with the TROM method for selected inks are not identical to what would be the crystallization times of a droplet of ink in an actual printing device. In an actual printing device such as a printer, the ink solidifies much faster. We determined that there is a good correlation between the total crystallization time as measured by the TROM method and the solidification time of an ink in a printer. In the standardized conditions described above, we determined that inks solidify within 10-15 seconds or less measured by the TROM method, are suitable for fast printing, typically at speeds from 100 feet/minute or higher. Therefore, for the purpose of the present disclosure, a rate of crystallization lower than 15 seconds, are considered to be fast crystallizing.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of Ink Samples

Ink Sample 1: Dibenzyl hexane-1,6-diyldicarbamate (78.4 g), Di-DL-menthyl L-tartrate (19.6 g) and Solvent Blue 101 (2 g) were combined and stirred at 140° C. for 1 h. The mixture was homogenized with an IKA Ultra-Turrax T10 homogenizer at 14000 rpm for 20 minutes before discharging the ink into an aluminum pan. Ink Sample 2: Dibenzyl hexane-1,6-diyldicarbamate (7.52 g), Di-DL-menthyl L-tartrate (1.88 g), Solvent Blue 101 (0.2 g) and dispersant Solsperse 32000 (0.2 g) were combined and stirred at 140° C. for 1 h. To the resulting solution was added silica dioxide PL-SiOF fumed silica (0.2 g) obtained from PlasmaChem GmbH, and the mixture was allowed to stir for an additional hour to ensure wetting of the silica particles. The mixture was homogenized with an IKA Ultra-Turrax T10 homogenizer at 14000 rpm for 20 minutes before discharging the ink into an aluminum pan, Ink Sample 3: Dibenzyl hexane-1,6-diyldicarbamate (6.14 g), Di-DL-menthyl L-tartrate (1.54 g), Solvent Blue 101 (0.16 g) and dispersant Solsperse 32000 (0.08 g) were combined and stirred at 140° C. for 1 h. To the resulting solution was added 40 nm NanoArc® Aluminum Oxide nanopowder (0.08 g), which is 40 nm aluminum oxide obtained from Nanophase, and the mixture was allowed to stir for an additional hour to ensure wetting of the silica particles. The mixture was homogenized with an IKA Ultra-Turrax T10 homogenizer at 14000 rpm for 20 minutes before discharging the ink into an aluminum pan. Ink Sample 4: Same as Ink Sample 3 except the 40 nm NanoArc® Aluminum Oxide nanopowder was repaced with 100 nm NanoArc® Aluminum Oxide nanopowder.

Example 2

Rheology of the Phase Change Inks

Figure 2:
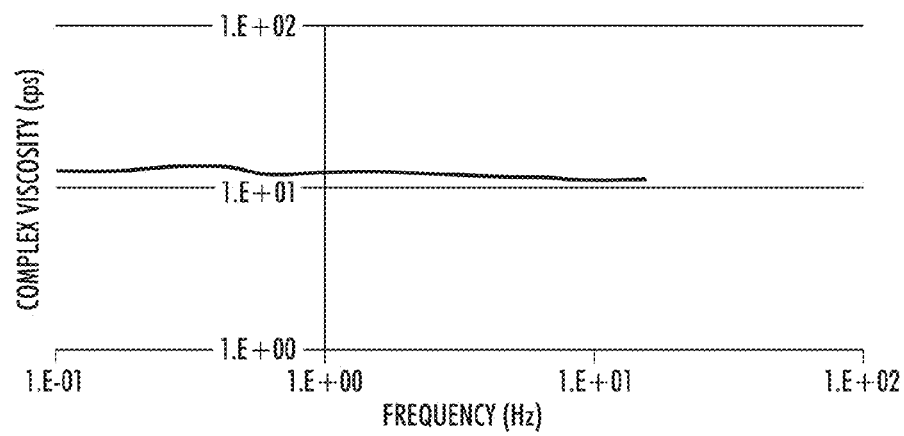
FIG. 2 is a graph illustrating viscosity data of a phase change ink as a function of frequency made according to the present embodiments. The viscosity measurements were made on a RFS Rheometer (TA instruments), using a 25 mm parallel plate at 140° C. The method used was a frequency sweep from low to high frequency (0.1 to 15.8 Hz).
Figure 3:
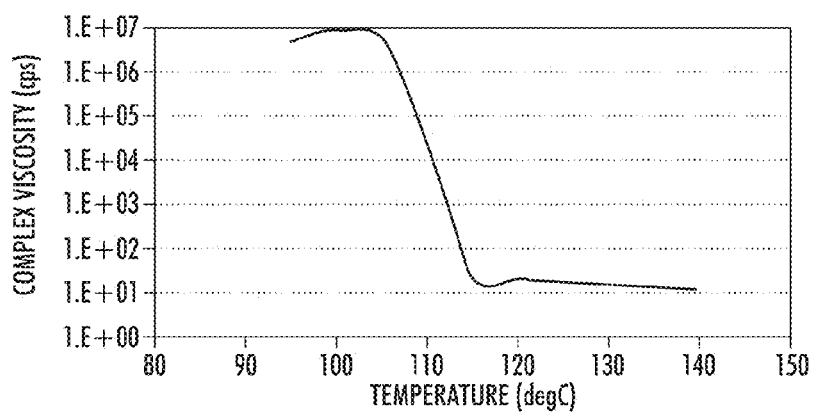
FIG. 3 is a graph illustrating the viscosity data of a phase change ink as a function of temperature made according to the present embodiments. The viscosity measurements were made on with the equipment described above, at a frequency of 1 Hz. The method used was a temperature sweep from high to low temperatures, in temperature steps of 5° C., a soak (equilibration) time of 120 seconds between each temperature and at a constant frequency of 1 Hz).

The rheology of Ink Sample 2 was measured and the data revealed that the ink exhibited Newtonian viscosity at 140° C. (see FIG. 2), as well as a jettable viscosity (~11 cps) at the same temperature (see FIG. 3).

Example 3

TROM Results

Rate of Crystallization

The rates of crystallization of the ink samples were measured by TROM procedure and shown below in Table 1.

It is shown that Ink Sample 2 with the addition of an inorganic nanoparticle additive crystallizes faster than the control Ink Sample 1.

TABLE 1

Composition and Crystallization Times by TROM

| Component | Sample 1 (wt %) | Sample 2 (wt %) | Sample 3 (wt %) | Sample 4 (wt %) |
|---|---|---|---|---|
| Dibenzyl hexane-1,6-diyldicarbamate | 78.2 | 75.2 | 76.8 | 76.8 |
| Di-DL-menthyl L-tartrate | 19.6 | 18.8 | 19.2 | 19.2 |
| Silica dioxide | — | 2.0 | — | — |
| Aluminum Oxide 40 nm | — | — | 1.0 | — |
| Aluminum Oxide 100 nm | — | — | — | 1.0 |
| Solsperse 32000 | — | 2.0 | 1.0 | 1.0 |
| SB101 (Keystone) | 2.0 | 2.0 | 2.0 | 2.0 |
| T total crystallization (s)* | 7 | 4 | 4 | 4 |

*as measured by Time Resolved Optical Microscopy (TROM) standardized conditions.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink comprising:

an amorphous compound, wherein the amorphous compound comprises an ester of citric acid of Formula II

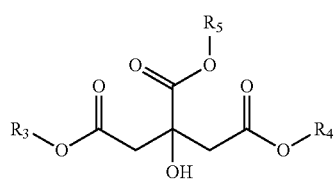

Formula II wherein each $R_3$, $R_4$ and $R_5$ is independently an alkyl group, wherein the alkyl is straight, branched or cyclic, saturated or unsaturated, substituted or unsubstituted, having from 1 to 40 carbon atoms or a substituted or unsubstituted aromatic or heteroaromatic group, and mixtures thereof, wherein amorphous compound having a low viscosity of from 1 to 100 cps at ≤140° C.;

a crystalline compound, wherein the crystalline compound comprises the following formula:

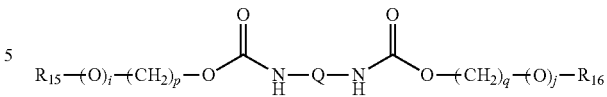

Formula VII wherein Q is —$(CH_2)_n$— wherein n is 4 to 8; each $R_{15}$ and $R_{16}$, is independently selected from benzyl, 2-phenylethyl, 2-phenoxyethyl, $C_6H_5(CH_2)_4$—, cyclohexyl, 2-methylcyclohexyl, 3-phenylpropanyl, 3-methylcyclohexyl, 4-methylcyclohexyl, cyclohexylmethyl, 2-methylcyclohexylmethyl, 3-methylcyclohexylmethyl, 4-methylcyclohexylmethyl, and 4-ethylcyclohexanyl; i is 1; j is 1; p is 1 to 4; q is 1 to 4;

the crystalline compound further comprises a compound selected from the group consisting of diphenyl sulfone, dimethyl sulfone, bis(4-hydroxyphenyl) sulfone, bis(4-aminophenyl) sulfone, bis(3-aminophenyl) sulfone, bis (4-chlorophenyl) sulfone, bis(4-fluorophenyl) sulfone, 2-hycroxyphenyl-4-hydroxyphenyl sulfone, phenyl-4-chlorophenyl sulfone, phenyl-2-aminophenyl sulfone, bis(3-amino-4-hydroxyphenyl) sulfone, dibenzyl sulfone, methylethyl sulfone, diethyl sulfone, methylisopropyl sulfone, ethylisopropyl sulfone, di-n-butyl sulfone, divinyl sulfone, methyl-2-hydroxymethyl sulfone, methylchloromethyl sulfone, sulfolane, 3-sulfolene, and mixtures thereof; and an inorganic nucleating agent, wherein the inorganic nucleating agent is present in the amount of from 1 to 3 eight percent based on the total weight of the phase change ink; wherein the phase change ink crystallizes faster from the liquid state than the same composition without the inorganic nucleating agent.

2. The phase change ink of claim 1, wherein the inorganic nucleating agent is selected from the group consisting of silica, alumina, zinc oxide, inorganic oxides, talc, barium, calcium, sodium, lithium, aluminum, and mixtures thereof.

3. The phase change ink of claim 2, wherein the inorganic nucleating agent is silica.

4. The phase change ink of claim 1, wherein the inorganic nucleating agent has particle size of from 2 nanometers to 300 nanometers.

5. The phase change ink of claim 1 further comprising a dispersant.

6. The phase change ink of claim 1, wherein the amorphous compound is present in an amount of from 5 percent to 40 percent by weight of the total weight of the phase change ink.

7. The phase change ink of claim 1, wherein the crystalline compound is present in an amount of from 60 percent to 95 percent by weight of the total weight of the phase change ink.

8. The phase change ink of claim 1, wherein the crystalline/amorphous ratio is from 60:40 to 95:5.

9. The phase change ink of claim 1 having a viscosity of from 1 to 22 cps at a temperature of 140° C.

10. The phase change ink of claim 1 having a viscosity of greater than $10^6$ cps at room temperature.

11. The phase change ink of claim 1, wherein the phase change ink crystallizes in less than 15 seconds.

12. The phase change ink of claim 1, wherein the phase change ink crystallizes in less then 10 seconds.

13. The phase change ink of claim 1, wherein the inorganic nucleating agent is selected from the group consisting of silica, alumina, zinc oxide, inorganic oxides, talc, barium, calcium, sodium, lithium, aluminum, and mixtures thereof.

14. A method of printing comprising:
providing an phase change ink in an ink jet printing apparatus;
melting the phase change ink; and
causing droplets of the melted ink to be ejected in an imagewise pattern onto an intermediate transfer member or a final recording substrate, wherein the phase change ink comprises
an amorphous compound, the amorphous compound comprising an ester of citric acid of Formula II

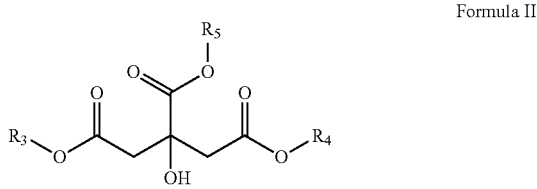

Formula II wherein each $R_3$, $R_4$ and $R_5$ is independently an alkyl group, wherein the alkyl is straight, branched or cyclic, saturated or unsaturated, substituted or unsubstituted, having from 1 to 40 carbon atoms or a substituted or unsubstituted aromatic or heteroaromatic group, and mixtures thereof, wherein amorphous compound having a low viscosity of from 1 to 100 cps at ≤140° C.;
a crystalline compound, the crystalline compound comprising the following formula:

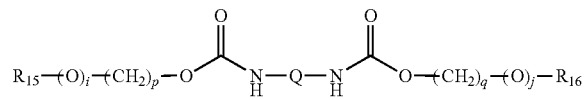

Formula VII wherein Q is —$(CH_2)_n$— where n is 4 to 8; each $R_{15}$ and $R_{16}$ is independently selected from benzyl, 2-phenylethyl, 2-phenoxyethyl, $C_6H_5(CH_2)_4$—, cyclohexyl, 2-methylcyclohexyl, 3-phenylpropanyl, 3-methylcyclohexyl, 4-methylcyclohexyl, cyclohexylmethyl, 2-methylcyclohexylmethyl, 3-methylcyclohexylmethyl, 4-methylcyclohexylmethyl, and 4-ethylcyclohexanyl; i is 1; j is 1; p is 1 to 4; q is 1 to 4;

the crystalline compound further comprises a compound selected from the group consisting of diphenyl sulfone, dimethyl sulfone, bis(4-hydroxyphenyl) sulfone, bis(4-aminophenyl) sulfone, bis(3-aminophenyl) sulfone, bis(4-chlorophenyl) sulfone, bis(4-fluorophenyl) sulfone, 2-hycroxyphenyl-4-hydroxyphenyl sulfone, phenyl-4-chlorophenyl sulfone, phenyl-2-aminophenyl sulfone, bis(3-amino-4-hydroxyphenyl) sulfone, dibenzyl sulfone, methylethyl sulfone, diethyl sulfone, methylisopropyl sulfone, ethylisopropyl sulfone, di-n-butyl sulfone, divinyl sulfone, methyl-2-hydroxymethyl sulfone, methylchloromethyl sulfone, sulfolane, 3-sulfolene, and mixtures thereof; and an inorganic nucleating agent, wherein the inorganic nucleating agent is present in the amount of from 1 to 3 weight percent based on the total weight of the phase change ink; and further wherein the phase change ink crystallizes faster from the liquid state than the same composition without the inorganic nucleating agent.

15. The method of claim 14, wherein the final recording substrate is selected from the group consisting of paper, transparency materials, fabrics, textile products plastics, polymeric films, metals and wood.

16. The method of claim 14, wherein the intermediate transfer member or the final recording sheet are heated to a temperature below that of the melted ink in the ink jet printing apparatus.

* * * * *